(12) United States Patent
Lojko

(10) Patent No.: US 11,518,301 B2
(45) Date of Patent: Dec. 6, 2022

(54) ROOF PANEL ASSEMBLY FOR A VEHICLE AND A PROJECTOR DEVICE FOR USE IN SUCH ROOF PANEL ASSEMBLY

(71) Applicant: Inalfa Roof Systems Group B.V., Oostrum (NL)

(72) Inventor: Sergej Sergeevic Lojko, Lottum (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/031,545

(22) Filed: Sep. 24, 2020

(65) Prior Publication Data

US 2021/0101527 A1  Apr. 8, 2021

(30) Foreign Application Priority Data

Oct. 8, 2019  (EP) ..................................... 19201929

(51) Int. Cl.
*B60Q 3/208* (2017.01)
*B60Q 3/54* (2017.01)
(Continued)

(52) U.S. Cl.
CPC ............ *B60Q 3/208* (2017.02); *B60J 7/0015* (2013.01); *B60Q 3/54* (2017.02); *B60J 7/0007* (2013.01);
(Continued)

(58) Field of Classification Search
CPC . B60Q 3/208; B60Q 3/54; B60Q 3/51; B60Q 1/2611; B60J 7/0015; B60J 7/043;
(Continued)

(56) References Cited

U.S. PATENT DOCUMENTS 3,546,659 A * 12/1970 Powers ................ H05K 7/1421
439/298
6,039,390 A * 3/2000 Agrawal ........... B32B 17/10036
296/211

(Continued)

FOREIGN PATENT DOCUMENTS

CN  103481829 A * 1/2014 ............ B60R 11/04
CN  204309703 U * 5/2015
(Continued)

OTHER PUBLICATIONS

Wang, "Vehicle-mounted audio and video system for two compartment vehicle and two-compartment vehicle with vehicle-mounted audio and video system", May 6, 2015, Edition: CN204309703U (Year: 2015).*

(Continued)

*Primary Examiner* — Dennis H Pedder
*Assistant Examiner* — Joyce Eileen Hill
(74) *Attorney, Agent, or Firm* — Steven M. Koehler; Westman, Champlin & Koehler, P.A.

(57) ABSTRACT

A roof panel assembly for use in a roof of a vehicle comprises at least one roof panel, providing a first interior surface configured to be directed to an interior space of the vehicle and a second interior surface configured to be directed to the interior space of the vehicle. The roof panel assembly further comprises a support beam arranged between the first interior surface and the second interior surface and a projector device arranged on the support beam. The projector device is configured to project a light image on at least one of the first interior surface and the second interior surface.

12 Claims, 6 Drawing Sheets

(51) Int. Cl.
  *B60J 7/00* (2006.01)
  *B60J 7/02* (2006.01)
  *B60J 7/043* (2006.01)
  *B60Q 1/26* (2006.01)
  *F21W 103/60* (2018.01)

(52) U.S. Cl.
  CPC ............... *B60J 7/022* (2013.01); *B60J 7/043* (2013.01); *B60Q 1/2611* (2013.01); *F21W 2103/60* (2018.01)

(58) Field of Classification Search
  CPC .......... B60J 7/0007; B60R 1/00; B60R 11/00; B60R 2011/0028; B60R 2011/0042; B60R 2011/0003; F21W 2103/60; H04N 9/00; H04N 9/3129
  USPC .............. 362/493, 488; 296/211; 353/13, 79
  See application file for complete search history.

(56) References Cited

U.S. PATENT DOCUMENTS

| | | | | |
|---|---|---|---|---|
| 6,558,028 | B1* | 5/2003 | Watkins | B60Q 3/74 |
| | | | | 362/504 |
| 7,052,068 | B2* | 5/2006 | Sturt | B60R 7/04 |
| | | | | 224/311 |
| 7,570,429 | B2* | 8/2009 | Maliah | G02B 27/0149 |
| | | | | 359/630 |
| 10,242,457 | B1* | 3/2019 | Sibley | G09G 3/003 |
| 2001/0005083 | A1* | 6/2001 | Serizawa | B60R 16/0207 |
| | | | | 296/37.8 |
| 2008/0259225 | A1* | 10/2008 | Park | G03B 21/145 |
| | | | | 348/789 |
| 2008/0272623 | A1 | 11/2008 | Kadzban et al. | |
| 2014/0117725 | A1* | 5/2014 | Rooijakkers | B60J 7/0573 |
| | | | | 296/223 |
| 2019/0202349 | A1* | 7/2019 | Winton | B60Q 3/51 |

FOREIGN PATENT DOCUMENTS

| | | | | | |
|---|---|---|---|---|---|
| CN | 106291928 | A | * | 1/2017 | ............. B60R 11/00 |
| CN | 106410535 | A | * | 2/2017 | ............. B60R 16/02 |
| JP | 2016053622 | A | * | 4/2016 | |
| WO | 2008121760 | A1 | | 10/2008 | |

OTHER PUBLICATIONS

Cai et al., "Visual field safety auxiliary device used in automobile cab", Published: Apr. 4, 2014, Chinese Patent Office, Edition: CN103481829A (Year: 2014).*

Casten, "Projection device of motor vehicle, and method for operating projection device of motor vehicle", Published Jan. 4, 2017, Chinese Patent Office, Edition: CN106291928A (Year: 2017).*

Deng et al., "Base device for electrical socket and vehicle interior assembly", Published Feb. 15, 2017, Chinese Patent Office, Edition: CN106410535A (Year: 2017).*

Hayakawa et al. "Display Device", Published Apr. 14, 2016, Japanese Patent Office, Edition: JP2016053622A (Year: 2016).*

European Search Report and Written Opinion in corresponding European Patent Application No. 19201929.7, dated Jan. 23, 2020.

* cited by examiner

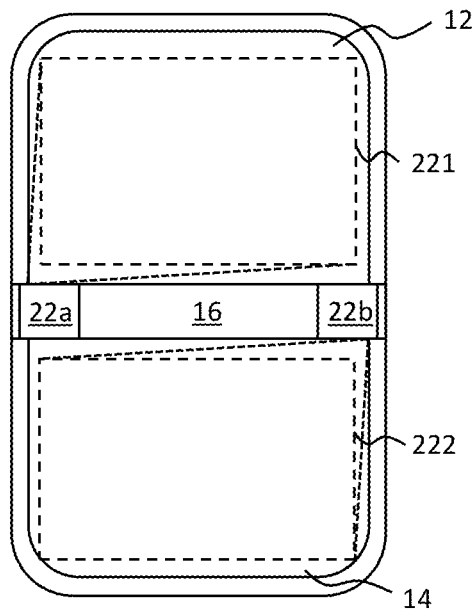 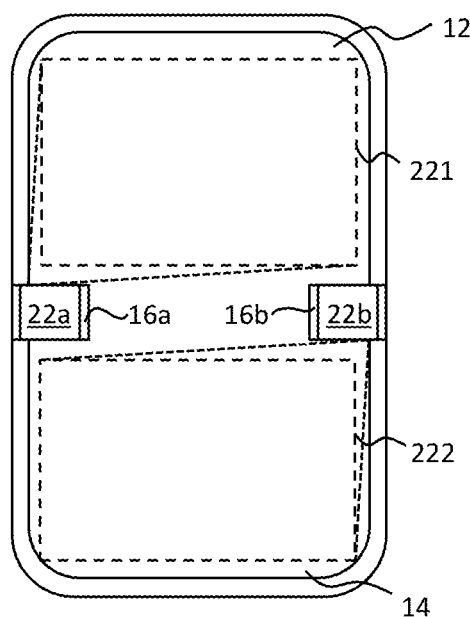
Fig. 7A                Fig. 7B
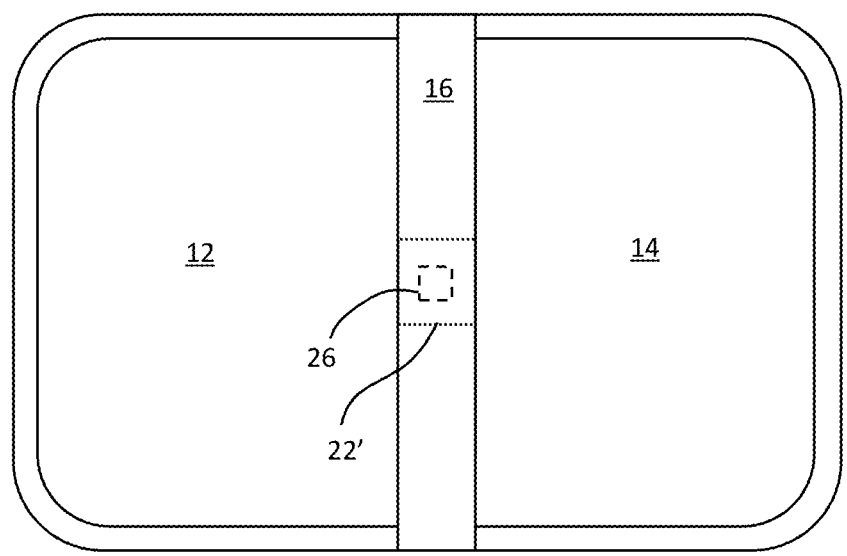
Fig. 8

ROOF PANEL ASSEMBLY FOR A VEHICLE AND A PROJECTOR DEVICE FOR USE IN SUCH ROOF PANEL ASSEMBLY

BACKGROUND

The discussion below is merely provided for general background information and is not intended to be used as an aid in determining the scope of the claimed subject matter.

Aspects of the invention relate to a roof panel assembly for a vehicle, wherein a static or dynamic image may be projected on an interior surface of the roof panel assembly. The present invention further relates to a projector device for use in such a roof panel assembly.

A roof panel assembly for a vehicle is commonly known. Such a roof panel assembly is mountable in a vehicle roof. For example, as well known, such a roof panel assembly may comprise a glass panel to provide a view from the interior space of the vehicle to the surroundings, in particular the sky, and to allow sunlight to enter the interior space. In another known embodiment, a roof panel of the roof panel assembly is moveably mounted such that the roof panel may be tilted or slid to provide an opening in the vehicle roof to allow air to enter the interior space of the vehicle. Of course, it is known that the moveable roof panel may be a glass panel.

Further, it is known to provide the roof panel assembly with lighting features. For example, a light conductive element may be arranged along an interior perimeter of the roof panel for providing ambient lighting. In another example, light is coupled into a light conductive layer of the roof panel and is coupled out into the interior space of the vehicle by a suitable pattern of elements, e.g. reflective elements, in or on a surface of the light conductive layer.

Further, it is known to provide a projector device in the interior space of the vehicle for projecting an image on an interior surface of the vehicle roof. In the prior art, the projector device is arranged in a head rest of a front seat or in a console between the front seats. It is also known to arrange a projector device on a roof body frame part in front of a roof panel assembly or rear of a roof panel assembly, wherein the projector device is configured to project an image on the roof panel of the roof panel assembly.

Arranging and projecting an image using a projector device requires careful calibration and settings for orienting the projected image relative to the surface on which the image is projected. In particular, with a projector device in the interior space or on a roof body frame part, it may be cumbersome and time-consuming to calibrate and adjust the projected image relative to the roof panel. For example, the roof panel assembly may be mounted on a vehicle body frame within a relatively large tolerance range as compared to the tolerance range for the position of the projected image. So, with a separately mounted projector device and roof panel, tolerances for mounting the roof panel assembly and for mounting the projector device add up and a vehicle manufacturer will thus be required to perform time-consuming and cumbersome calibration and adjustment procedures, which significantly add to the costs for providing a projector device.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background. In a first aspect, the object is achieved in a roof panel assembly for use in a roof of a vehicle according to claim 1. The roof panel assembly according to the present invention comprises at least one roof panel, providing a first interior surface configured to be directed to an interior space of the vehicle and a second interior surface configured to be directed to the interior space of the vehicle. The roof panel assembly according to the present invention further comprises a support beam arranged between the first interior surface and the second interior surface; and a projector device arranged on the support beam, wherein the projector device is configured to project a light image on at least one of the first interior surface and the second interior surface.

In the roof panel assembly according to the present invention, the projector device is mounted on a part of the roof panel assembly. The relative positioning of the projector device and one or both of the first and second interior surfaces is now only dependent on any manufacturing tolerances in the roof panel assembly, which are much smaller tolerances compared to the tolerances of the known art. Moreover, such tolerances may be so small that any position deviation may be optically or digitally compensated by the projector device, thus not requiring mechanical adjustments, or the like. Such minor adjustments are not required to be performed during vehicle manufacturing, but may be performed in later stage, e.g. by a user, thus reducing time and costs for the vehicle manufacturing in general and projector device installation in particular.

In an embodiment of the roof panel assembly according to the present invention, the at least one roof panel comprises a glass panel provided with a reflective pattern for reflecting the light image into the interior space of the vehicle. The reflective pattern may be a pattern of reflective dots on the surface or a number of particles in the glass of the panel. The pattern may be a switchable layer, e.g. an electrochromic or a PDLC layer, or any other suitably reflecting layer. In particular, as used herein, the reflective pattern may be a regular or irregular pattern of dots or particles or may be a fully covering layer. Essentially, the reflective pattern is intended to reflect a projected image into the interior space of the vehicle such that the image is visible to a driver or passenger in the vehicle.

In a particular embodiment, the reflective pattern may comprise relatively small dots of a reflective material arranged on a surface of the glass panel, the dots having a representative diameter (i.e. a dot having a surface area equal to a circle having the representative diameter) smaller than 80 micron, preferably smaller than 65 micron and more preferably smaller than 50 micron, wherein the dots are spaced apart at such distances that less than about 10%, preferably less than 7% and more preferably less than 5% of the surface area of the glass panel is covered with reflective material of the dots. Such a pattern may relatively easily and cost-effectively provided on the glass panel and such a pattern has shown to be transparent in daylight conditions for outside viewing, while appearing fully reflective for projected images.

In an embodiment, the roof panel assembly comprises a winding shaft for holding a flexible sunshade web, wherein, in an open position, the flexible sunshade web is arranged on the winding shaft and wherein, in a closed position, the flexible sunshade web is arranged in a plane between the interior space of the vehicle and at least one of the first interior surface and the second interior surface. Such a rollable sunshading web of fabric is well known in the art and is not further elucidated herein. In a particular embodiment thereof, the winding shaft is arranged between the support beam and the projector device. The projector device may need to be arranged at a certain minimum distance from the interior surface on which the image is to be projected. Such minimum distance may provide a suitable spacing to arrange the winding shaft without affecting a height of the roof panel assembly.

In another particular embodiment thereof, the projector device projects the light image on at least one of the interior surface and the second interior surface when the sunshade web is in the open position and wherein the projector device projects the light image on the flexible sunshade web when the sunshade web is in the closed position. The projector device may be arranged and configured to project on either the glass panel, when the flexible sunshade web is in the open position, or on the sunshade web, when the flexible sunshade web is in the closed position, so that projection of an image is independent of the position of the sunshade web, allowing to project images at any time.

It is noted that, as used herein, projecting on a certain surface preferably includes that the projected image is projected in focus on such surface, although if the projected image is merely used for illumination of the interior space, the projected image is not required to be in focus and may even be preferred not to be in focus. Still, in a more particular embodiment, the projector device is configured to adapt to projecting the light image on the flexible sunshade web or on the at least one of the first interior surface and the second interior surface. Adaptation to the surface on which the image is projected may thus comprise focussing the image on the surface but may also comprise adapting a projection direction or angle for positioning the projected image on said surface. Any other adaptation may be comprised as well. Such adaptations may be realized by optical adaptations, digital adaptations or an adaptation of a position of the projector device. Alternatively or additionally, another adaptation may be suitably performed as well.

In an embodiment, the projector device is provided with a storage medium storing a predetermined light image for projecting the predetermined light image for illuminating the interior space of the vehicle and the projector device is provided with an input port for receiving a light image from an external device. Thus, the projector device may be used stand-alone for illuminating the interior space of the vehicle. For example, the interior surface may be radiated over its complete surface area or an edge portion along a perimeter of the interior surface may be illuminated. If a particular image or a movie, i.e. a sequence of images, is to be displayed on the interior surface, an external device may be connected to the input port for providing data representing the light image(s) to be projected and displayed.

In a second aspect, the present invention provides for a roof panel assembly for use in a roof of a vehicle, wherein the roof panel assembly comprises at least one roof panel, providing a first interior surface configured to be directed to an interior space of the vehicle and a second interior surface configured to be directed to the interior space of the vehicle.

The roof panel assembly further comprises a support beam arranged between the first interior surface and the second interior surface and a mounting device arranged on the support beam for mounting a projector device such that the projector device is arranged to project a light image on at least one of the first interior surface and the second interior surface. Thus, a roof panel assembly may be provided with a mounting device for mounting a projector device such that the projector device may be mounted in a later stage than during manufacturing of the roof panel assembly. For example, the projector device may be sold separately as an accessory to the roof panel assembly. Due to the relatively small tolerances and thus relatively minor adjustments required for installation, the projector device may be easily installed by a user.

In a particular embodiment thereof, the mounting device comprises an electrical socket for supplying electrical power to the projector device. While a data input port may be wireless, supply of power is best provided by permanently wired connection.

In a third aspect, the present invention provides for a projector device for projecting a light image, the projector device comprising a coupling device, the coupling device being configured to couple to the mounting device of the roof panel assembly according to the second aspect of the present invention such that the projector device is arranged to project the light image on at least one of the first interior surface and the second interior surface. In a particular embodiment, the coupling device comprises an electrical plug, wherein the electrical plug is configured to mate with the electrical socket of the roof panel assembly according to the above-mentioned particular embodiment of the second aspect for receiving electrical power.

In another particular embodiment of the projector device according to the present invention, the projector device is provided with a wireless data input port for receiving light image data representing the light image to be projected.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art.

BRIEF DESCRIPTION OF THE DRAWINGS

FIG. 7A shows a bottom view of a fifth embodiment of a roof panel assembly;

FIG. 7B shows a bottom view of a sixth embodiment of a roof panel assembly; and

FIG. 8 shows a bottom view of an embodiment of a roof panel assembly according to the second aspect of the present invention.

DETAILED DESCRIPTION OF THE ILLUSTRATIVE EMBODIMENTS

Figure 1A:
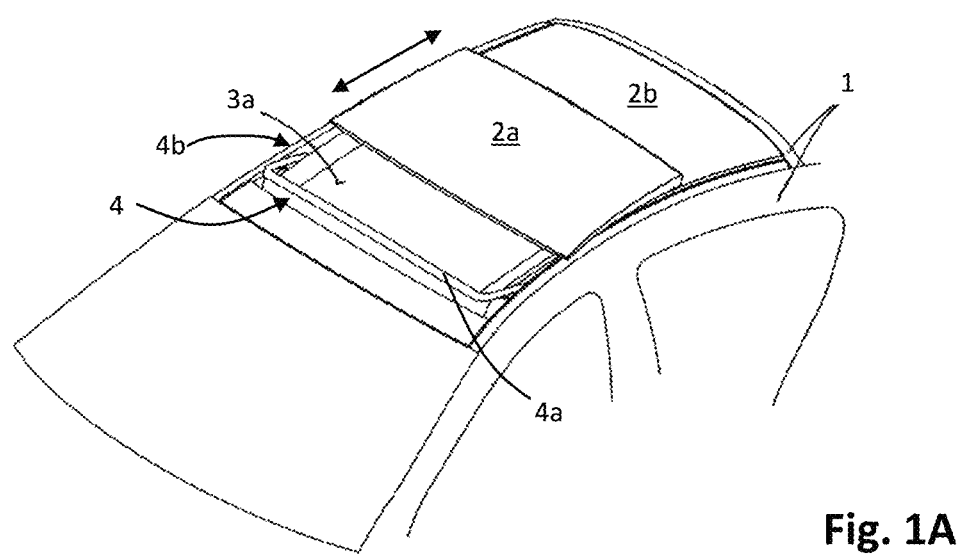
FIG. 1A shows a perspective view of a vehicle roof with an open roof assembly.

The present invention will now be described with reference to the accompanying drawings, wherein the same reference numerals have been used to identify the same or similar elements throughout the several views.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
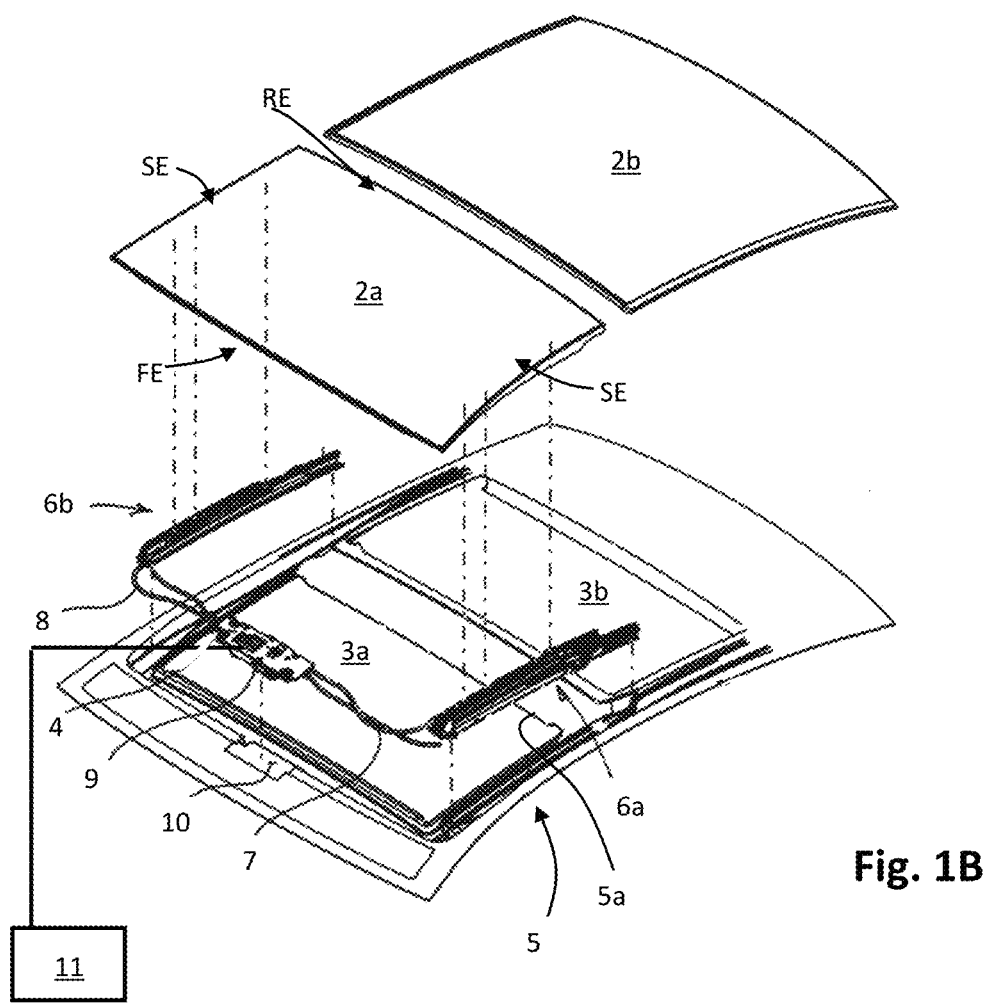
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a drive motor 9.

The drive cables 7, 8 couple the drive motor 9 to the mechanisms of the respective guide assemblies 6a, 6b such that upon operating the drive motor 9, the mechanisms start to move. In particular, a core of the drive cable 7, 8 is moved by the drive motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, a drive motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the drive motor 9 is mounted near or below the front end FE of the moveable panel 2a at a recess 10. In another embodiment, the drive motor 9 may be positioned at any other suitable position or location. For example, the drive motor 9 may be arranged near or below the rear end RE of the moveable panel 2a or below the fixed panel 2b.

A control unit 11 is schematically illustrated and is operatively coupled to the drive motor 9. The control unit 11 may be any kind of processing unit, either a software controlled processing unit or a dedicated processing unit, like an ASIC, as well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the drive motor 9 and thus the moveable roof assembly.

Figure 2A:
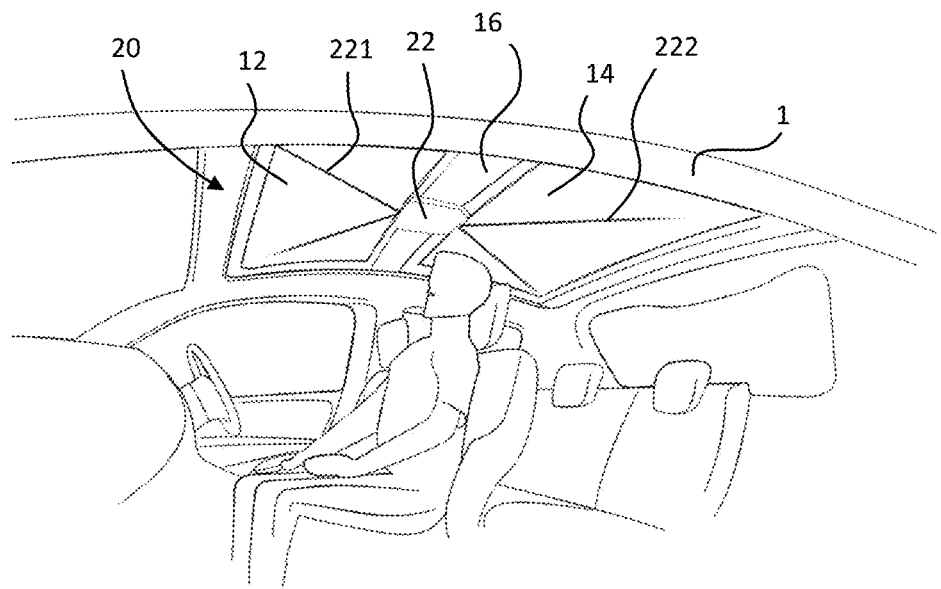
FIGS. 2A-2C each show an artist impression of a vehicle provided with a first embodiment of a roof panel assembly.
Figure 2B:
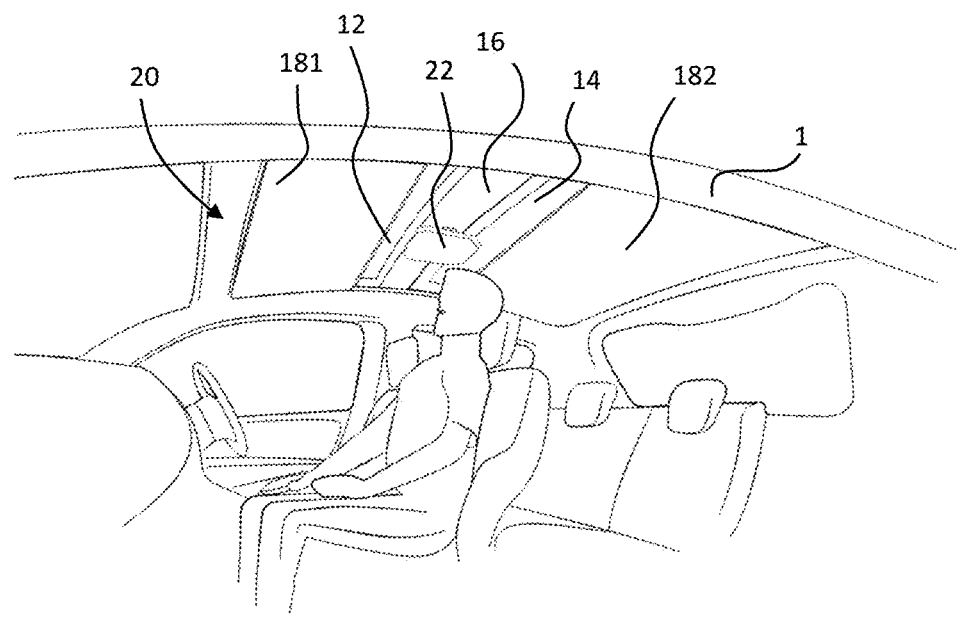
Figure 2C:
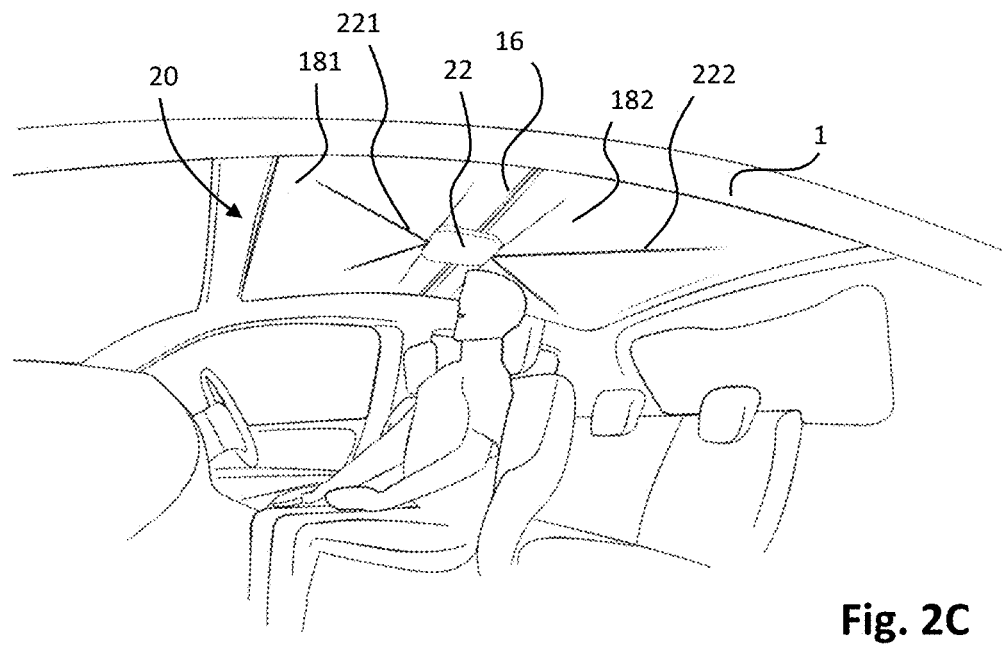

FIGS. 2A-2C show a vehicle with a vehicle roof 1 and a vehicle interior space 20. In the vehicle roof 1, a roof panel assembly according to the present invention is provided. The roof panel assembly may correspond to the open-roof assembly according to FIGS. 1A and 1B, wherein a first roof panel, e.g. a first glass panel, is moveably arranged and a second roof panel, e.g. a second glass panel, is fixedly arranged. However, any other configuration may be used as well. For example, a single fixed glass panel may be used or two moveable panels may be used. The present invention is not limited in any way with respect to the configuration of the one or more roof panels employed. As illustrated in FIGS. 2A-2C, the roof panel assembly according to the present invention comprises a first interior surface 12 and a second interior surface 14, wherein a support beam 16 is arranged between the first and second interior surfaces 12, 14. As used herein, the support beam 16 is 'arranged between' the respective interior surfaces 12, 14 when the support beam 16 visually separates the first and the second interior surfaces 12, 14, in particular when viewed from the interior space of the vehicle 20.

The roof panel assembly as shown in FIGS. 2A-2C further comprises a first flexible sunshade web 181 and a second flexible sunshade web 182 for covering the glass panels of the interior surfaces 12, 14, e.g. to prevent excessive sunlight. Further, the support beam 16 supports a projector device 22. The illustrated projector device 22 comprises a dual optical system for providing a first light image 221 on the first interior surface 12 and a second light image 222, wherein the first and the second light images 221, 222 may be identical or different.

In FIG. 2A, the flexible sunshade webs 181, 182 are in a closed position such that the projector device 22 projects the respective light images 221, 222 on the interior surfaces 12, 14, respectively. In FIG. 2B, the sunshade webs 181, 182 are partly closed and the projector device 22 is shown in a switched-off state. FIG. 2C illustrates the sunshade webs 181, 182 in the closed position and the projector device 22 is in a switched-on state, wherein the respective light images 221, 222 are projected on respective interior surfaces of the sunshade webs 181, 182.

Figure 3A:
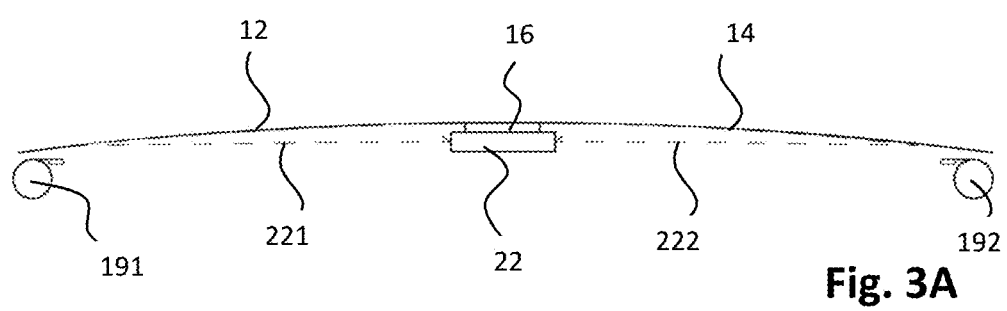
FIGS. 3A-3C each show a cross-section of the first embodiment of FIGS. 2A-2C, respectively.

FIG. 3A shows a cross-section of the roof panel assembly as shown in FIG. 2A. As illustrated, the projector device 22 is arranged close to the interior surfaces 12, 14 and projects the respective light images 221, 222 on the interior surfaces 12, 14. A first winding shaft 191 holds the flexible sunshade web 181 and a second winding shaft 192 holds the flexible sunshade web 182. Both sunshade webs 181, 182 are in an open position.

Figure 3B:
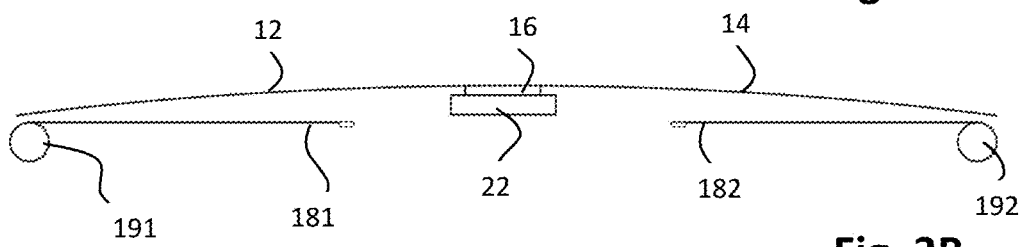

FIG. 3B is a cross-section corresponding to the roof panel assembly according to FIG. 2B. The sunshade webs 181, 182 are in a partly closed position and the projector device 22 does not project any image. As apparent from FIGS. 2A-2C and 3A-3C, the sunshade webs 181, 182 are arranged in a plane between the interior surfaces 12, 14 and the interior space 20 of the vehicle. Further, it is noted that the sunshade webs 181, 182 are not required to have a same open or closed state; for example, the first sunshade web 181 may be in an open state, while the second sunshade web 182 may be in a closed state.

Figure 3C:
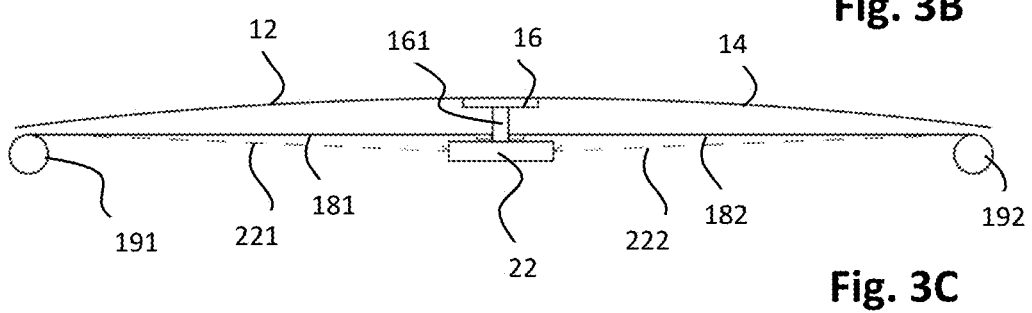

As shown in FIG. 3C, corresponding to FIG. 2C, the projector device 22 projects the first and second light images 221, 222 on interior surfaces of the sunshade webs 181, 182. In order to be capable of projecting on the sunshade webs 181, 182, in the illustrated first embodiment, the projector device 22 is arranged on an extendible, e.g. telescopic support tube 161, which is supported by the support beam 161. Thus, when the sunshade webs 181, 182 are in a closed position, the projector device 22 may be arranged in a lowered position.

Figure 4A:
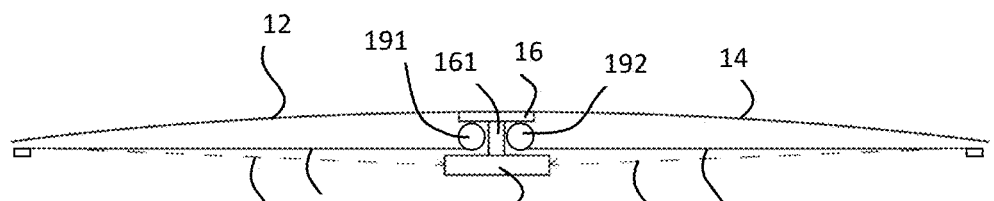
FIGS. 4A-4B each show a cross-sectional view of a second embodiment of a roof panel assembly.
Figure 4B:
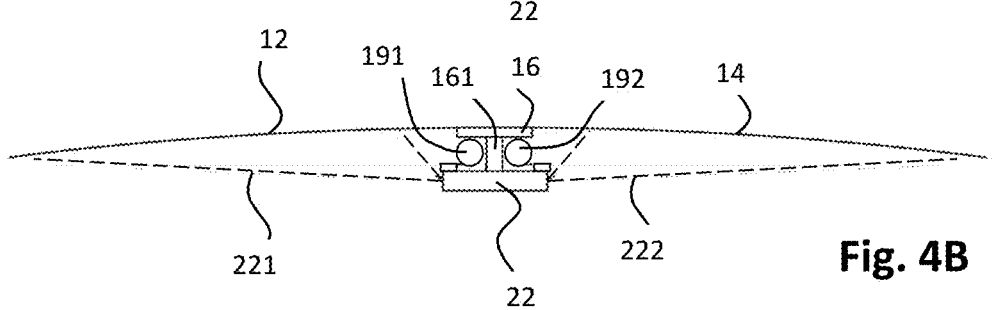

FIGS. 4A and 4B illustrate a second embodiment, wherein the projector device 22 is stationarily arranged. The winding shafts 191, 192 of the sunshade webs 181, 182, respectively, are arranged between the one or more roof panels of the first and second interior surfaces 12, 14 and the projector device 22, wherein a static support tube 161 couples the support beam 16 and the projector device 22. In the closed position of FIG. 4A, the projector device 22 is configured to project light images 221, 222 on the fabric of the sunshade webs 181, 182, while in the open position of FIG. 4B, the projector device 22 is configured to project the images 221, 222 on the interior surfaces 12, 14. In this second embodiment, the projector device 22 is provided with adaptable optical systems for compensating for the focal distance and the positioning of the projections of the light images 221, 222.

Figure 5:
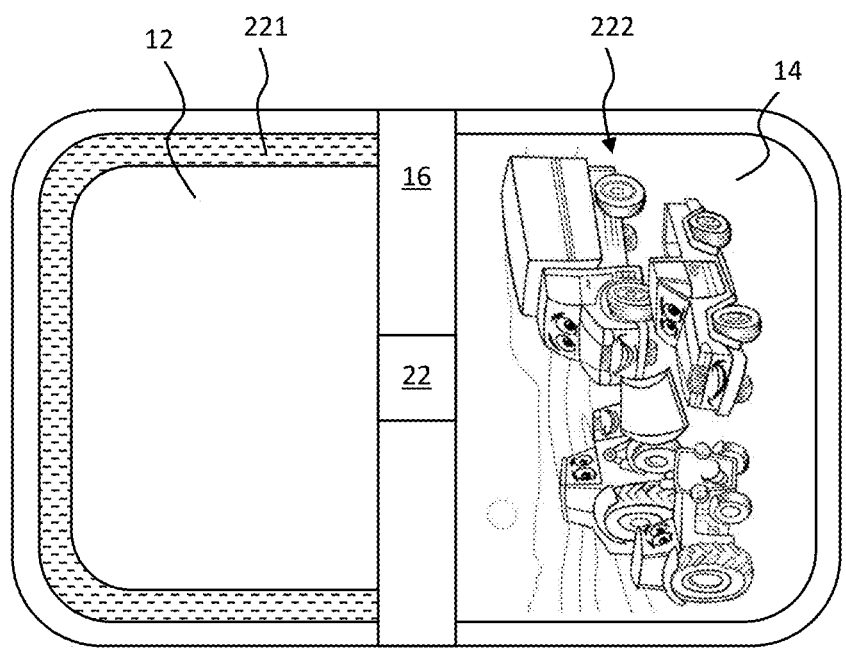
FIG. 5 shows a bottom view of a roof panel assembly.

FIG. 5 shows a schematical bottom view, i.e. a view from the interior space 20 of the vehicle, of a roof panel assembly according to the present invention, e.g. of the first embodiment or second embodiment. In the illustrated state, the projector device 22 projects a first image 221 on the first interior surface 12 and a different second image 222 on the second interior surface 14. In particular, the first light image 221 is a static lighting image along a perimeter of the first interior surface 12, which may be suitable to provide for a kind of ambient lighting in the vehicle. The second light image 222 is illustrated as a static or dynamic (movie) image. So, for example, at a driver position, a calming static light image 221 may be provided, while for children in the backseats of the vehicle a movie may be played. It is noted that the present invention is not limited to a versatile projector device 22 suitable for static and dynamic images. For example, embodiments of the projector device 22 may vary from a relatively simple static light projecting device for interior illumination to a high-resolution, high-contrast, movie-playing projector device.

Figure 6A:
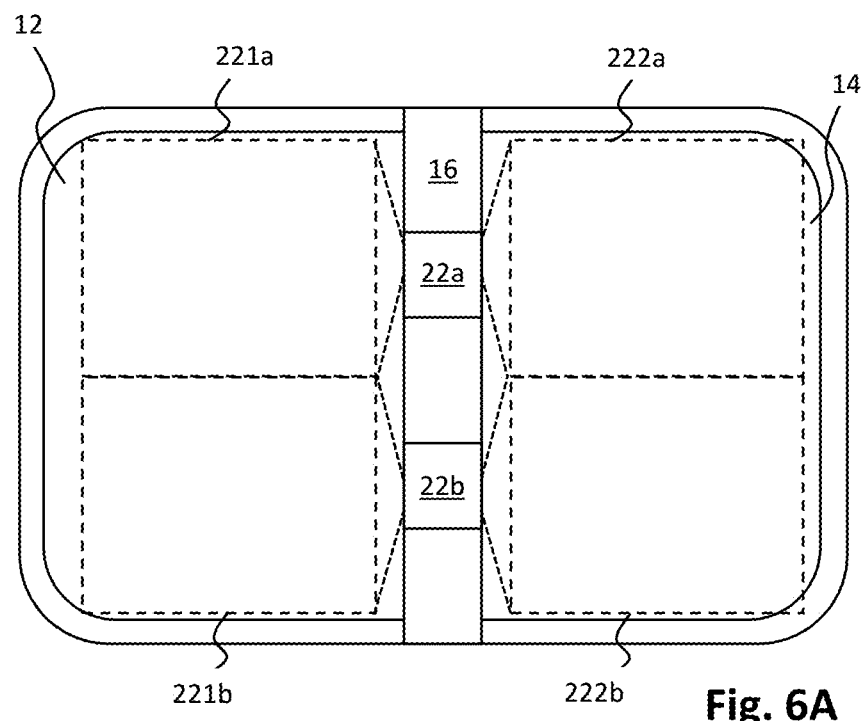
FIG. 6A shows a bottom view of a third embodiment of a roof panel assembly.

FIG. 6A shows a bottom view of a third embodiment of a roof panel assembly according to the present invention, wherein two projector devices 22a and 22b are provided on the support beam 16. Each of the two projectors 22a, 22b may provide a first light image 221a, 221b and a second light image 222a, 222b on the first interior surface 12 and the second interior surface 14, respectively. Of course, in another embodiment, two projectors 22a, 22b may be provided, a first one for projecting an image on the first interior surface 12 and a second one for projecting an image the second interior surface 14. Moreover, it is noted that within the scope of the present invention, only a single projector 22 may be provided that is suited and configured to only project an image on one of the first and the second interior surfaces 12, 14.

Figure 6B:
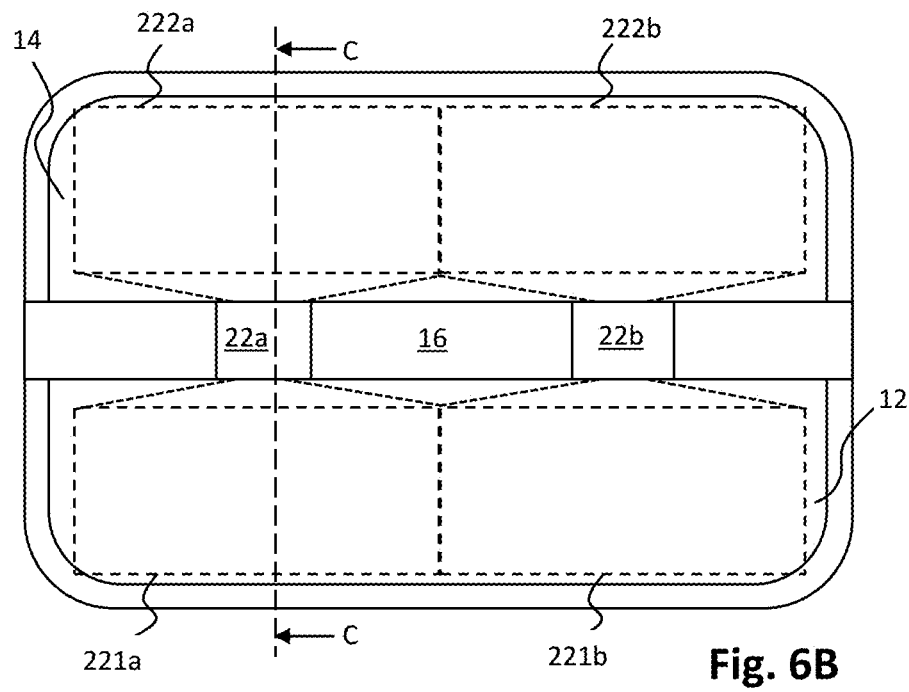
FIG. 6B shows a bottom view of a fourth embodiment of a roof panel assembly.

While the first, second and third embodiments comprise a support beam 16 extending in a width direction of the vehicle, FIG. 6B illustrates a fourth embodiment, wherein the support beam 16 extends in a length direction of the vehicle, i.e. from front to rear. Similar to the third embodiment of FIG. 6A, the illustrated fourth embodiment comprises two projector devices 22a, 22b for providing four separate light images 221a, 221b, 222a and 222b, but it is noted that any other configuration or number of projector devices is contemplated as well.

Figure 6C:
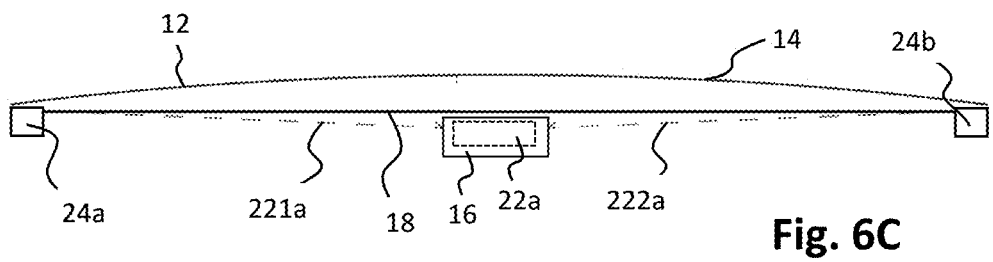
FIG. 6C shows a cross-sectional view along line C-C of the fourth embodiment of FIG. 6B.

FIG. 6C shows the fourth embodiment in more detail in a cross-sectional view along line C-C as shown in FIG. 6B. As apparent from this cross-sectional view, the support beam 16 may be arranged below the plane in which the sunshade web 18 is arranged. This arrangement of the support beam 16 and the sunshade web 18 allows for the use of a single sunshade web 18 and a single winding shaft (not shown), reducing weight and costs. The sunshade web 18 is at its edge portion supported and guided in guide rails 24a and 24b. Further supports and guides may be provided on or in the support beam 16. Further, it is contemplated that, instead of the arrangement in the length direction, the support beam 16 may be arranged in the width direction as well, while the single sunshade web 18 is arranged between the support beam 16 and the interior surfaces 12, 14.

FIGS. 7A and 7B show a fifth and sixth embodiment, respectively, wherein two projector devices 22a, 22b are arranged close to respective corners of each of the interior surfaces 12, 14. From the corner of the interior surface 12, 14, the projector device 22a, 22b is configured to project a light image 221, 222, respectively. In these embodiments, an angle of projection, i.e. an angle of spreading of a bundle of light exiting the projector device, may be significantly smaller, e.g. about 90°, than in the first to fourth embodiments, wherein the respective projector devices 22, 22a, 22b need an angle of projection as close as possible to 180°. In the illustrated fifth and sixth embodiments, the light bundle is asymmetrically arranged relative to the projector device 22a, 22b. In a particular embodiment, the optical elements in the projector devices 22a, 22b may be arranged such that the light bundle may exit in a symmetrical way to ease the optical requirements on the optical elements.

While in the first to fifth embodiments the support beam 16 extends from one side of the roof panel assembly to an opposite second side of the roof panel assembly, in the sixth embodiment of FIG. 7B, the support beam is embodied in a first support beam 16a and a second support beam 16b, each extending from one side of the roof panel assembly over a length sufficient for supporting the projector device 22a, 22b. Thus, a visible surface area of the roof panel, i.e. a surface area of the roof panel not covered by any other element, is optimised for both projection of light images and visibility of the surroundings and the sky. This embodiment may be particularly suited for a large fixed glass roof panel.

FIG. 8 shows a bottom view of another embodiment of the roof panel according to the present invention and in particular of the second aspect according to the present invention. In this embodiment, a mounting device 26 is provided on the support beam 16 for mounting a projector device on a projector position 22'. The mounting device 26 is configured to receive a mating coupling device (not shown) on a projector device such that the projector device is accurately positioned relative to the first and the second interior surfaces 12, 14. The mounting device 26 may incorporate electrical connections, e.g. a power supply socket for supplying electrical power to a mounted projector device. Further, a socket for a wired image data connection may be provided as well. So, in this embodiment of the roof panel assembly, the projector device is optional, while a dedicated mounting device is provided. Without a projector device mounted, the mounting device 26 may be covered by a suitable covering plate or e.g. a common interior lighting device, which may be using the optional power supply socket as well. As an example, in the latter embodiment, a user may obtain a suitably configured and designed projector device as an accessory, remove the cover or common lighting device and mount the obtained projector device. As apparent to those skilled in the art, this embodiment may be combined with any of the above-described embodiments by replacing the projector device 22 by a mounting device 26. Further, the person skilled in the art is believed to be enabled to select a suitable mounting device and mating coupling device for use in the second and third aspect of the present invention, which are therefore not further elucidated and described herein.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A roof panel assembly for use in a roof of a vehicle, the roof panel assembly comprising:
   at least one roof panel, including:
      a first interior surface configured to be directed to an interior space of the vehicle; and
      a second interior surface configured to be directed to the interior space of the vehicle;
   a support beam arranged between the first interior surface and the second interior surface; and
   a projector device arranged on the support beam, wherein the projector device is configured to project at least one light image from the projector device onto the first interior surface and from the projector device onto the second interior surface.

2. The roof panel assembly according to claim 1, wherein the at least one roof panel comprises a glass panel having a reflective pattern configured to reflect the light image into the interior space of the vehicle.

3. The roof panel assembly according to claim 1, wherein the roof panel assembly comprises a winding shaft for holding a flexible sunshade web, wherein, in an open position, the flexible sunshade web is arranged on the winding shaft and wherein, in a closed position, the flexible sunshade web is arranged in a plane between the interior space of the vehicle and the first interior surface and the second interior surface.

4. The roof panel assembly according to claim 3, wherein the winding shaft is arranged between the support beam and the projector device.

5. The roof panel assembly according to claim 3, wherein the projector device projects the light image on the first interior surface and the second interior surface when the flexible sunshade web is in the open position and wherein the projector device projects the light image on the flexible sunshade web when the flexible sunshade web is in the closed position.

6. The roof panel assembly according to claim 5, wherein the projector device is configured to adapt to projecting the light image on the flexible sunshade web or the first interior surface and the second interior surface.

7. The roof panel assembly according to claim 1, wherein the projector device is provided with a storage medium storing a predetermined light image for projecting the predetermined light image for illuminating the interior space of the vehicle and wherein the projector device is provided with an input port for receiving a light image from an external device.

8. The roof panel assembly of claim 1 and further comprising
a mounting device arranged on the support beam for mounting the projector device.

9. The roof panel assembly according to claim 8, wherein the mounting device comprises an electrical socket for supplying electrical power to the projector device.

10. The roof panel assembly of claim 8, wherein the projector device comprises a coupling device, the coupling device being configured to couple to the mounting device such that the projector device is arranged to project onto the first interior surface and the second interior surface.

11. The roof panel assembly according to claim 10, wherein the mounting device comprises an electrical socket for supplying electrical power to the projector device, wherein the coupling device comprises an electrical plug, and wherein the electrical plug is configured to mate with the electrical socket of the roof panel assembly for receiving electrical power.

12. The roof panel assembly according to claim 1, wherein the projector device is provided with a wireless data input port for receiving light image data representing the light image to be projected.

* * * * *